United States Patent [19]

Smolarek et al.

[11] Patent Number: 5,759,242

[45] Date of Patent: Jun. 2, 1998

[54] RADIAL BED VACCUM/PRESSURE SWING ADSORBER VESSEL

[75] Inventors: James Smolarek, Boston; Frederick Wells Leavitt, Amherst; Jeffert John Nowobilski, Orchard Park; Victor Emmanuel Bergsten, East Amherst; John Harry Fassbaugh, Elma, all of N.Y.

[73] Assignee: Praxair Technology, Inc., Danbury, Conn.

[21] Appl. No.: 681,550

[22] Filed: Jul. 23, 1996

[51] Int. Cl.[6] .................................................. B01D 53/047
[52] U.S. Cl. .................................. 96/149; 96/144; 96/151
[58] Field of Search ........................ 96/108, 130, 143, 96/144, 149, 151; 55/475, 516, 518

[56] References Cited

U.S. PATENT DOCUMENTS

| | | | |
|---|---|---|---|
| 2,079,934 | 5/1937 | Fitch, Jr. et al. | 55/516 X |
| 2,108,730 | 2/1938 | Sutcliffe | 96/144 |
| 2,112,335 | 3/1938 | Drennan | 55/518 X |
| 2,519,296 | 8/1950 | Simpson | 96/103 X |
| 2,626,675 | 1/1953 | Maher | 96/144 |
| 3,487,608 | 1/1970 | Grä | 96/130 X |
| 3,507,621 | 4/1970 | Goodman et al. | 55/518 X |
| 3,655,346 | 4/1972 | Cotabish et al. | 55/518 X |
| 3,815,335 | 6/1974 | Barnebey | 55/516 X |
| 4,095,965 | 6/1978 | Neumann et al. | 55/518 X |
| 4,541,851 | 9/1985 | Bosquain et al. | 55/208 |
| 4,544,384 | 10/1985 | Metsch et al. | 55/180 |
| 4,778,492 | 10/1988 | Dawson | 96/130 X |
| 4,786,489 | 11/1988 | Grenier et al. | 423/581 |
| 4,997,465 | 3/1991 | Stanford | 55/179 |
| 5,071,449 | 12/1991 | Sircar | 55/26 |
| 5,080,700 | 1/1992 | Bergloff et al. | 96/144 X |
| 5,118,331 | 6/1992 | Garrett et al. | 55/269 |
| 5,133,784 | 7/1992 | Boudet | 55/25 |
| 5,176,721 | 1/1993 | Hay et al. | 55/25 |
| 5,232,479 | 8/1993 | Poteau et al. | 55/387 |
| 5,348,573 | 9/1994 | Tomassian et al. | 96/151 |
| 5,441,559 | 8/1995 | Petit et al. | 96/130 X |
| 5,593,475 | 1/1997 | Mirch | 96/130 X |

FOREIGN PATENT DOCUMENTS

| | | | |
|---|---|---|---|
| 0402783 | 12/1990 | European Pat. Off. | 96/144 |
| 3802997 | 8/1989 | Germany | 96/130 |
| 3939518 | 6/1991 | Germany | 96/108 |
| 54-068776 | 6/1979 | Japan | 96/144 |
| 1780815 | 12/1992 | Sweden | 96/143 |
| 1281287 | 1/1987 | U.S.S.R. | 96/130 |
| 0711735 | 7/1954 | United Kingdom | 55/475 |
| 2045107 | 10/1980 | United Kingdom | 96/151 |

*Primary Examiner*—Robert Spitzer
*Attorney, Agent, or Firm*—Robert J. Follett

[57] ABSTRACT

A vessel for use in a pressure swing adsorption gas separation process includes an enclosing wall which defines an enclosed space having a top region and a bottom region. An annular adsorbent bed is positioned within the enclosed space and has a porous outer wall, a porous inner wall and adsorbent material positioned between the walls. The porous outer wall is separated from the enclosing wall to create a gas feed channel therebetween, and the porous inner wall surrounds an inner tank whose wall surface is separated from the porous inner wall and creates a product flow channel therebetween. A gas feed/distribution baffle structure is positioned in the bottom region of the vessel and in fluid communication with the gas feed channel to provide a gas feed thereto. The gas feed enters the gas feed channel and the adsorbent bed via the porous outer wall and in a direction generally radially towards the inner porous wall and product flow channel. A product outlet is positioned in the bottom region and in fluid communication with the product flow channel, for collecting product gas passing thereinto via the porous inner wall from the adsorbent bed. A flexible membrane extends between the porous outer wall and the porous inner wall, at the upper extremities thereof, and is pressurized so as to bear upon the upper surface of the adsorbent material to prevent fluidization during gas flow.

19 Claims, 3 Drawing Sheets

5,759,242

RADIAL BED VACCUM/PRESSURE SWING ADSORBER VESSEL

FIELD OF THE INVENTION

This invention relates to a vessel used in a pressure swing adsorption (PSA) or vacuum/pressure swing adsorption (VPSA) process and, more particularly, to an improved radial bed vessel for use in a VPSA process.

BACKGROUND OF THE ART

The VPSA and PSA processes employ a selective adsorbent to remove at least one component of a gas from a gas mixture. Both processes employ four basic process steps: adsorption, depressurization, purge and repressurization. PSA and VPSA processes are well known and are widely used to selectively separate air components, i.e. oxygen and nitrogen.

The design of the adsorber vessel is critical to efficient operation of an air separation system. Improvements in the design of the adsorber vessel contribute to lower power consumption, lower capital cost and increased plant capacity.

VPSA vessels are typically designed as axial flow adsorbers which have limited applicability when plant capacity requirements yield a vessel diameter larger than 4–5 meters, thereby exceeding economical shipment limits. This results in an expensive and difficult requirement to field assemble the axial flow vessels. Such large diameter vessels also have inherently large void volume percentages in the upper and lower head spaces, and present flow distribution difficulties as a result of the large cross-section. As a result, the economics of large scale VPSA systems (i.e., >80 tons per day) are compromised when axial flow, vessel designs are employed.

VPSA system operation is adversely affected by bed pressure drop and void volume within the vessel. Bed pressure drop represents a substantial source of inefficiency in a VPSA process. Large gas flows into and out of the adsorbers are required, due to the relatively low operating pressures and recovery of these systems. This large gas flow results in high superficial gas velocities across the bed, creating an unwanted pressure drop, and contributing to a loss in efficiency. Such bed pressure drop losses typically comprise 10–15% of the power consumption.

In an axial flow bed, if the adsorber bed cross-section is increased by enlarging the diameter and lowering the superficial velocity, larger adsorbent inventories are required. This increases capital cost in order to improve power consumption, resulting in little gain in overall economics.

Void spaces in an adsorption vessel also create losses in a VPSA system. The volume of gas left in a lower head space is pressurized and depressurized during the cycle, ultimately resulting in air blow-down losses. Similarly, the volume of gas left in an upper head space, which is enriched in oxygen after the product make step, is subsequently evacuated in the waste step and acts as an inefficient oxygen purge. This inefficient use of oxygen purge gas results in a lowering of the overall process efficiency.

Advanced VPSA cycles employ powerful adsorbents with a relatively short cycle, and the blow-down losses and top head oxygen purge losses can become quite large.

The use of advanced adsorbents and cycles drives VPSA process design towards reduced bed length. The advanced adsorbents typically can operate efficiently with a lower transfer length, hence a vessel design that readily accommodates this feature is attractive. The use of shorter bed lengths with axial vessels is possible, but when large size plants are desired, the diameter of the vessel becomes prohibitively large.

Most large PSA systems employ either parallel axial flow vessels with four bed versions of the two bed cycle, or large horizontal vessels with conventional cycles. The use of multiple vessel, four bed designs adds to the complexity and cost of the facility. The use of horizontal vessels adds the inefficiency of a non-uniform bed geometry and results in higher power consumption. Neither design is considered to be optimized for large scale VPSA oxygen production.

Radial bed design configurations exist in the prior art, originating primarily from prepurifier and reactor system design. See U.S. Pat. Nos. 5,232,479 to Poteau et al., 4,544,384 to Metschl et al., 4,541,851 to Bosquain et al. and 3,620,685 to Rogers. In some cases, such radial bed designs have been claimed for use in PSA systems. Each of the prior art radial bed designs exhibits one or more of the following impediments:

1) Large void volumes;
2) Non-uniform flow paths;
3) The design not sized for reversing flow operation;
4) The design incorporates multiple adsorbent bed sections;
5) Complicated internal structures exist making adsorbent loading difficult;
6) High pressure drop; etc.

Accordingly, it is an object of the invention to provide an improved vessel for use in a VPSA or PSA process which employs only a single adsorber chamber with low void volumes.

It is another object of the invention to provide an improved vessel for use in a VPSA process which enables reversible flow direction and improved flow distribution.

It is a further object of the invention to provide an improved vessel for use in a VPSA process which utilizes a densely packed adsorbent in a restrained adsorbent bed and exhibits a reduced adsorbent inventory.

It is yet a further object of the invention to provide an improved vessel for use in a VPSA process which enables: a reduction in power consumption as compared to conventional designs; a scale up of plant size by a factor better than that afforded by prior art designs; and a plant capacity that is not limited by adsorber vessel volume.

SUMMARY OF THE INVENTION

A vessel for use in a pressure swing adsorption gas separation process includes an enclosing wall which defines an enclosed space having a top region and a bottom region. An annular adsorbent bed is positioned within the enclosed space and has a porous outer wall, a porous inner wall and adsorbent material positioned between the walls. The porous outer wall is separated from the enclosing wall to create a gas feed channel therebetween, and the porous inner wall surrounds an inner tank whose wall surface is separated from the porous inner wall and creates a product flow channel therebetween. An optional gas feed/distribution baffle structure is positioned in the bottom region of the vessel and in fluid communication with the gas feed channel to provide a gas feed thereto. The gas feed enters the gas feed channel and the adsorbent bed via the porous outer wall and in a direction generally radially towards the inner porous wall and the product flow channel. A product outlet is positioned in fluid communication with the product flow channel, for collecting product gas passing thereinto via the porous inner wall from the adsorbent bed. A flexible membrane extends between the porous outer wall and the porous inner wall, at the upper extremities thereof, and is pressurized so as to bear upon the upper surface of the adsorbent material to prevent its fluidization during gas flow.

DETAILED DESCRIPTION OF A PREFERRED EMBODIMENT

Figure 1:
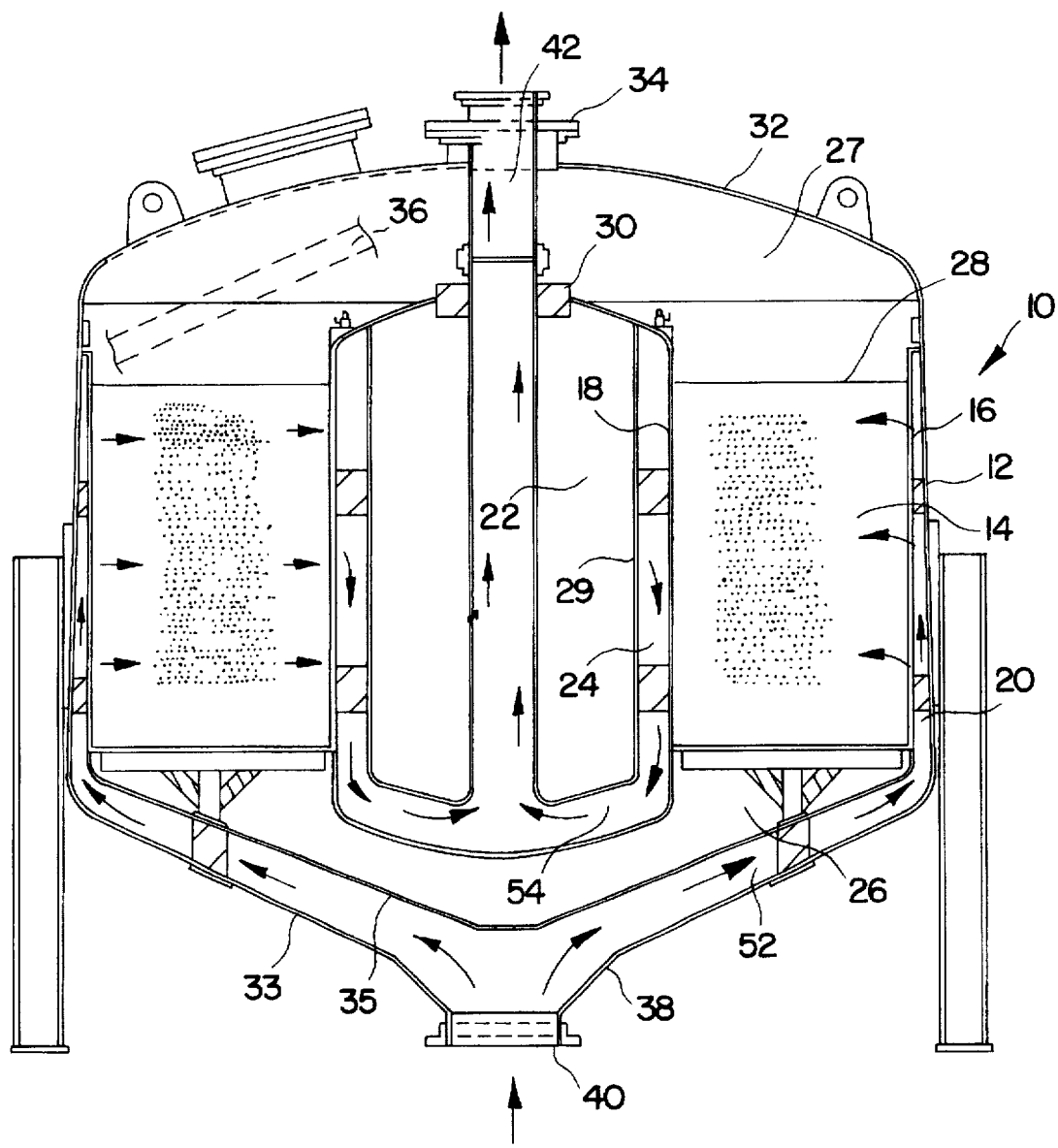
FIG. 1 is a schematic showing of a VPSA vessel incorporating the invention hereof.

Initially, the overall structure of VPSA vessel 10 will be described in relation in FIGS. 1-3, followed by a detailed consideration of each of the vessel's major components. VPSA vessel 10 (see FIG. 1) comprises an outer vessel wall 12 within which, an annular radial bed 14 is positioned. Radial bed 14 comprises a densely packed region of adsorbent beads that are held in place by an outer annular screen wall 16 and an inner annular screen wall 18. The region between vessel wall 12 and outer screen wall 16 defines an outer annular channel 20. The region between inner screen wall 18 and an outer wall 29 of an internal tank 22 defines an inner annular channel 24.

Radial bed 14 rests upon a bed support structure 26. At its uppermost extremity, radial bed 14 is pressed downwardly by a pressurized bladder 28. A pressure inlet (not shown) pressurizes the region beneath top head 32, thereby causing an extension of bladder 28 against the adsorbent in bed 14. Further, internal tank 22 is also maintained, via opening 30, at the same pressure level as bladder 28.

Top head 32 encloses the uppermost region of VPSA vessel 10 and, via opening 34, enables introduction of a removable feed pipe 36 for loading of adsorbent beads into adsorbent bed 14. At the lowermost extremity of VPSA vessel 10 resides an inlet feed and waste conduit 40. Conduit 40 is attached to lower distribution section 38 which distributes both the inwardly and outwardly flowing gas. Lower distribution section 38 is attached to radial flow channel 52 which carries gas flow to external annular flow channel 20. Channel 52 is defined by the walls of lower external head 33 and lower internal head 35.

Figure 3:
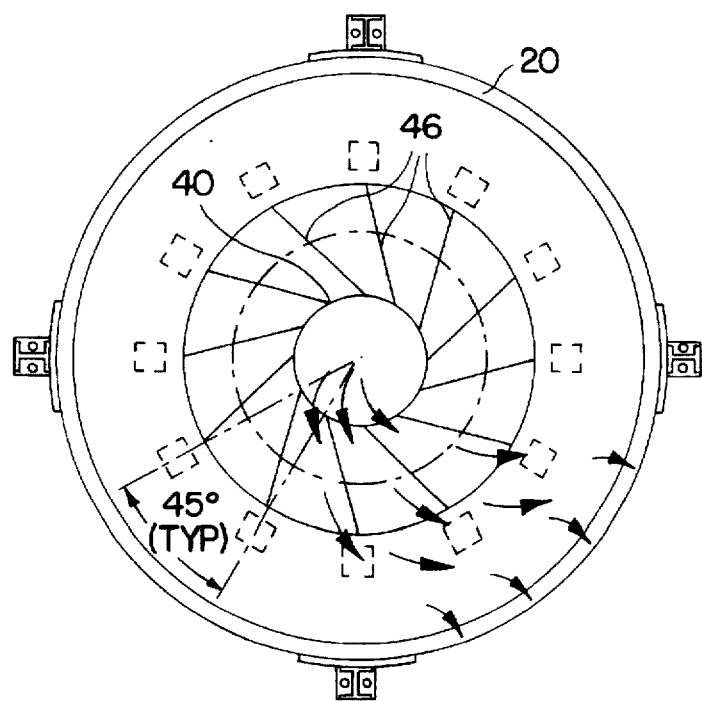
FIG. 3 is a schematic showing an optional radial flow distribution baffle for distributing inlet gas flow to the VPSA vessel of FIG. 1.

Referring to FIG. 3, details for an optional lowermost radial flow distribution baffle 38 are shown. Gas entering via outer conduit 40 is directed by baffles 46 along a generally radial direction towards outer annular feed channel 20. Baffles 46 assure a relatively uniform distribution of inlet gas into outer annular feed channel 20. This lower distribution can also be accomplished with a perforated plate (not shown) replacing baffles 46.

Figure 2:
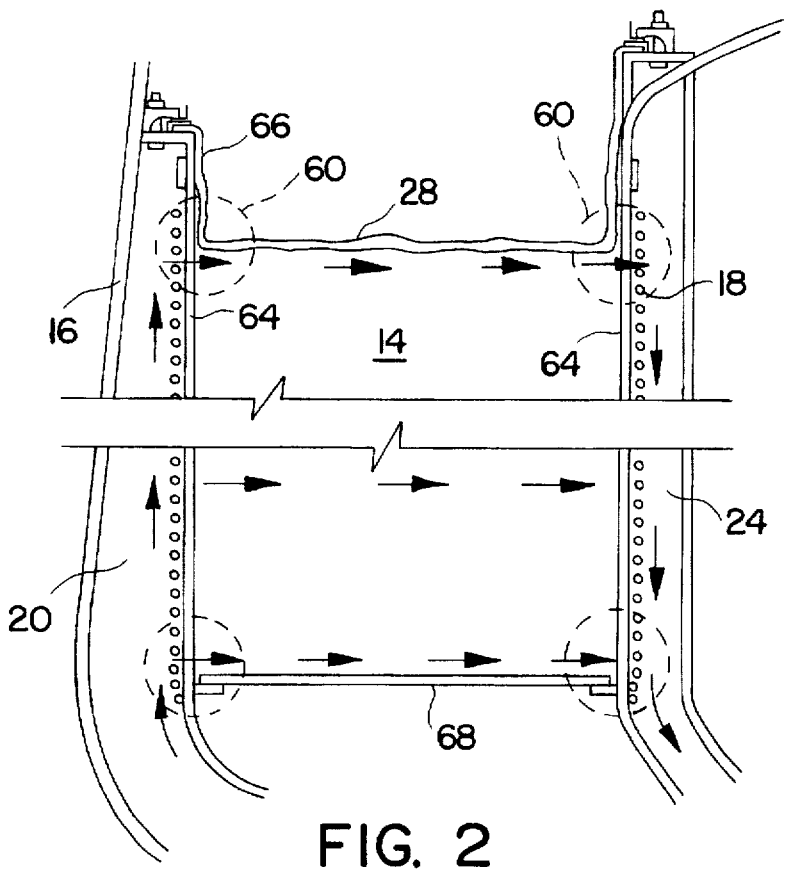
FIG. 2 is a schematic sectional view showing structural details of inner and outer screen walls which restrain an adsorbent bed that is included in the VPSA vessel of FIG. 1.

As shown in FIGS. 1 & 2, the gas entering outer annular feed channel 20 travels upwardly and proceeds radially through outer screen wall 16 into radial adsorbent bed 14. There, the less desired gas in the feed is adsorbed and the more desired gas exits through inner screen wall 18 and into inner annular product channel 24. From there, the product gas flows downwardly and out conduit 42 through the top of vessel 10.

The details of VPSA vessel 10 will now be discussed. Feed and waste gas is supplied through conduit 40, and process piping is constructed with internal straightening to provide a nearly uniform flow profile into vessel 10 at a minimum pressure drop. The feed gas then passes through radial flow distribution section 38 which uniformly distributes the gas to outer annular feed channel 20 through section 52. Radial flow distribution baffles 46, shown on FIG. 3, are employed in the optional arrangement. These baffles impart a centrifugal flow pattern to the radially flowing gas. The gas exits with a centrifugal flow pattern and is further mixed and pressure equalized an open, lower head area 52.

A straight wall perforated baffle can also be used in place of radial baffles 46. The perforated baffle will likely have a higher pressure drop as compared to radial baffles 46. These operational baffle arrangements are employed when incoming gas in conduit 40 is not of a uniform profile and further straightening is required.

The gas, which now is uniformly distributed in lower head area 52, is supplied to radial adsorption bed 14 via vertical, outer annular feed channel 20. The gas flows through adsorber bed 14 in an inward and radial manner. The gas exiting at the product end of adsorber bed 14 is collected in inner annular product channel 24, and flows downward. This flow arrangement forms a "U", shaped flow pattern.

The product gas is collected in head space collection region 54 at the bottom of VPSA vessel 10. The collected product gas exits vessel through conduit 42, exiting the top of vessel 10.

Figure 4:
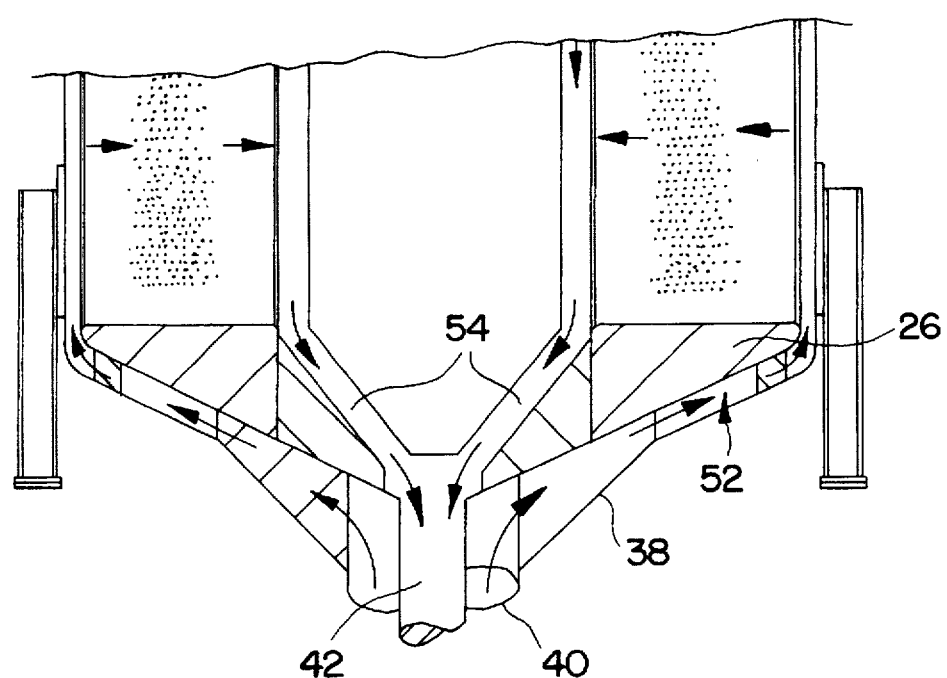
FIG. 4 is a schematic showing structural details of a "U" shaped flow profile vessel with product conduit 42 exiting at the bottom of the adsorber.

Product gas conduit 42 can also be designed to exit from the bottom of the vessel. FIG. 4 shows an arrangement where product conduit 42 is contained within feed conduit 40 and exits from the bottom.

Vessel flow distribution is critical to successful operation of a VPSA process. A major contributor to flow distribution is the channel pressure differential between the feed and product ends of radial adsorber bed 14. The pressure differential is a combination of frictional pressure losses and velocity head recovery or loss of the flowing gases. These effects tend to cancel when flow is entering a channel and are additive when flow is exiting a channel. The degree of cancellation and addition is affected by the internal geometry of the chamber, (i.e., straight walled, straight taper, or parabolic taper). Further, all VPSA processes reverse the gas flow direction, periodically, to accomplish subsequent adsorption and desorption process steps. Therefore, the impact of flow mal-distribution introduced in each step must be weighed accordingly.

The "U" shaped gas flow orientation and tapered wall vertical flow chamber geometry 20 are responses to the above considerations. It has been found that tapered flow channels improve flow distribution in the reversing flow application. The tapered flow channels are effective by allowing for larger inlet areas at the bottom end, or gas outlet/inlet of channel 20. These large areas substantially reduce the pressure loss in the feed and waste streams, hence improve process efficiency. The tapering of channel 20 reduces the unwanted void of this channel. This void results in a blowdown loss when the pressure levels are reversed. The channel tapering balances void volume and pressure drop loss. The U shaped flow path, in combination with tapered walled flow channels, maximize the process efficiency of VPSA vessel 10, while also minimizing the flow mal-distribution effects associated with a reversing flow pattern at a minimum void space. While outlet channel 24 is shown without taper, it could also be tapered from top to bottom.

Some flow mal-distribution in a radial bed design is inevitable with the VPSA requirements. The selection of the overall flow path and internal flow path geometry shown in FIGS. 1–3, balances the frictional and dynamic pressure losses in the flow channels over the entire cycle and results in an acceptable balance between flow distribution, pressure drop and void.

Each channel width is chosen, based upon a trade-off between pressure drop, void volume and flow distribution losses for the given process. The preferred width of the entrance of outer annular feed channel 20 is 4.5% of the vertical length of adsorbent bed 14, within a preferred range of 4%–5%, and within a general range of 2%–8% The preferred width of inner annular product channel 24 is 9% of the vertical length of adsorbent bed 14, within a preferred range of 7–11%, and within a general range of 5–13%.

The feed area of outer annular feed channel 20, as a ratio to the area of inner annular product channel 24, is chosen to correspond to the process gas flows and is preferably 2.4, within a preferred range of 1.25–3.

Bed Support Structure 26:

VPSA vessel 10 is designed to minimize unnecessary void regions. The void at the feed end of adsorbent bed 14 is minimized by bed support structure 26. Bed support structure 26 is constructed as an internal tank. The design thereby eliminates the void volume associated with this area. Lower head volume in a conventional vessel is left unoccupied and represents an unnecessary loss in the system. Such voids are cycled during operation and are alternately pressurized and depressurized, creating blow-down losses. VPSA vessel 10 has, on the feed side, a void volume percentage typically between 10–25% of the volume of adsorbent bed 14.

The internal tank bed support system can be designed as a closed pressure vessel capable of withstanding the cyclic pressure stresses, or as a tank filled with a solid material, thereby left open to the lower pressure of the vessel.

Void Volume, Product Side:

The void volume at the product side of radial adsorbent bed 14 is minimized by internal tank 22, located at the center of VPSA vessel 10. Internal tank 22 is open at the top 30 and is pressurized to the same pressure as hold-down bladder 28. The lower section of tank 22 is closed by a head, further reducing unnecessary void and distributing incoming oxygen reflux gas.

The product side void volume is cycled during operation, and oxygen product in these channels is pressurized and depressurized, acting as inefficient oxygen purge in the evacuation step. This inefficient use of oxygen purge causes a lengthening of the oxygen/nitrogen desorption front, with a subsequent loss of oxygen during the waste removal step. This results in a lowering of oxygen recovery. To reduce these losses, VPSA vessel 10 has a product side void percentage typically between 3–10% of the volume of adsorbent bed 14.

Uniform profile of Adsorbent Bed 14:

The internal bed flow path is critical in VPSA operations. A uniform bed profile is necessary to promote and maintain gas flow distribution. This is particularly acute at the top and bottom corners of the bed where adjoining surfaces meet. The internal bed design and flow path is shown in FIG. 2. Adsorbent bed 14 is completely symmetrical with no discontinuities at any adjoining surfaces and the internal flow path is completely uniform, with no unswept bed areas.

The interface between screen walls 16 and 18 and bladder 28 is shown at dashed circles 60. The screen walls extend above adsorbent bed 14 and the adsorbent beads are covered and sealed by bladder 28. This height is between 2–4% of the bed's vertical length, allows for a variation in the adsorbent level at initial loading or due to a variation caused by settling, and allows no unswept areas. The screens are sealed to perforated support plates 64 by seal rings 66, which are designed to accept the screen without creating large obstructions that cannot be covered by bladder 28. This system provides a positive adsorbent and bladder seal.

The screen walls extend below bed support plate 68, and are attached into this area using a seal ring or filler material that is inserted into a groove (not shown). This area is completely filled with sealant, resulting in a uniform flow path.

Pressurized Bladder 28:

Adsorbent bed 14 is restrained by the sealing action of flexible bladder 28. Bladder 28 provides both a bed restraint and is an integral part of the flow assembly that provides for a uniform bed flow profile. The radial flow path in vessel 10 creates a bed differential pressure that would lift the top corner sections of the bed if restraint were not supplied. Bladder 28 is designed to provide this restraint, with no voids or non-uniform flow paths.

Bladder 28 is placed on top of adsorbent bed 14, only covering the bed area formed within the two concentric circles of the inner and outer edges of the bed. Bladder 28 is then sealed at the edges by compression clamps and is pressurized by pressurizing top head region 27 to a pressure higher than the maximum cycle pressure. A compressible sponge material (not shown) is inserted on top of the adsorbent bed adjacent to walls 18 & 16 Compression of this material by bladder 28 insures restraint of the adsorbent at the top corners of the bed. This insures a hold down at all process conditions. The vessel structure is designed to resist this maximum hold down pressure.

Top Loading Assembly:

VPSA vessel 10 is designed to provide space to accommodate installation and operation of the adsorbent dense loader system shown in U.S. Pat. No. 5,234,159, assigned to the same Assignee as this application. The disclosure of U.S. Pat. No. 5,234,159 is incorporated herein by reference. Upper head space 27 (FIG. 1) is left open to accommodate rotating arm assembly 36. The relatively short bed, low pressure drop VPSA process carried out in VPSA vessel 10 requires a uniform dense-loaded adsorbent. This dense-loaded adsorbent provides a uniform pressure drop profile in bed 14 that is necessary to maintain uniform flow distribution.

Arm assembly 36 is removed after adsorbent loading. Application of this loading system is specifically made possible by the design of the removable top flange/product piping assembly with internal connector, the low profile internal top void tank and the removable bed hold down bladder.

Radial Flow Distribution Baffle:

The feed air stream passes through an optional radial flow distribution baffle (FIG. 3) which uniformly distributes the gas circumferentially to outer annular channel 20. Baffles 46, in the optional arrangement, impart a centrifugal flow pattern to the radially flowing gas which then is further mixed and pressure equalized in open lower head area 52. Baffles 46 are shown straight, but can be curved to reduce separation and pressure drop. The inlet flow distribution system can also be designed with a perforated plate or another baffle assembly to create a radial pressure drop.

Differential temperature effects:

Although VPSA processes are not designed to create large differential temperatures, the inlet and outlet temperatures are different. The design described above accommodates this by attaching inner screen walls 18 of adsorber bed 14 only to the lower stationary bed support, leaving the top of inner screen walls 18 free to move with changing process temperatures.

While a preferred embodiment has been described, a number of variations are possible. The pressurized section above bladder 28 may be replaced by a dense material. This dense material may be metallic and ceramic balls that would provide the required down load on bladder 28 to restrain the adsorbent.

The optional inlet gas flow distribution system may be designed differently. The structure described above induces a circumferential flow direction to the radially outward flowing gas. This pressurized gas is then equalized in the surrounding annulus. The radial baffles can be replaced by a perforated plate baffle, essentially producing the same distribution, but with a slightly increased pressure drop. Staged perforations could be used in place of uniform perforations on the inlet and outlet radial bed perforated wall plates.

Although vessel 10 is designed specifically for VPSA operation in an oxygen cycle, it can be employed in other applications. These would include any adsorption process not requiring high temperature thermal regeneration, such as: PSA adsorption for Oxygen or Nitrogen production, and PSA prepurification of air. The vessel design parameters would need to be altered to suit the specific flow requirements of the application.

In summary, the invention provides a number of advantageous features:

Single Fixed Bed:

Vessel 10 combines adsorbent, process and vessel design attributes in order to operate with an integral prepurifier section in adsorbent bed 14. This feature is different from many other vessels which employ a separate adsorber section to accomplish prepurification. Vessel 10 therefore contains only one adsorbent bed section which includes both the prepurifier and main separation zones, leading to a simplified construction. Vessel 10 enables large scale production of oxygen employing VPSA technology with a fixed adsorbent bed. Other adsorber vessel designs employ multiple adsorbent chambers that are rotated around internal porting within the vessel to accomplish process gas flow switching. Such rotating bed technology is prohibitively complex to employ at large sizes.

Outside-In Feed Flow Profile:

Feed air is adsorbed during cycling of the system, and the vessel is arranged with the feed gas flowing from the outside towards the center, taking advantage of the geometry that reduces bed cross-section in conjunction with the reducing gas flow. The outer feed side flow area, as a ratio to the inner product side flow area, corresponds to process gas flows.

Reversible Flow Direction: ("U" shaped flow path)

The gas flow path is arranged with feed flow upwards along the outside channel and product flow down in the center channel creating a "U" shaped flow pattern. The VPSA process operates with a reversing gas flow direction during periods of the cyclic process, and vessel 10 is designed to accommodate the reverse flow directions.

Reversible Flow Direction:

Simulations were conducted on tapered versus straight wall flow passages. Calculations show that tapered flow paths offer the lowest pressure drop and void volume, while maintaining acceptable flow distribution. Vessel 10 is designed with tapered vertical flow channels.

Low Void Volume—Short Cycle Application:

Low void volume in the feed and product distribution channels is essential to efficient operation of an advanced VPSA system. VPSA systems employing advanced adsorbents and cycles operate with a short cycle time. This feature is a natural result of the high utilization of the adsorbent and low bed size factors. The volume of gas in the lower head is pressurized and depressurized during the cycle, resulting in a blow-down loss. The volume of gas in the upper head is enriched in oxygen, and when vessel 10 is evacuated, this gas is pulled through the bed, acting as an inefficient oxygen purge and elevating the oxygen content in the waste. This inefficient use of oxygen purge results in a lowering of the overall process recovery.

The blow down losses and oxygen purge losses would be quite large if specific measures were not taken to minimize the void. This radial bed design of vessel 10 minimizes the feed end and product end voids.

Uniform Bed flow Area:

Vessel 10 includes a bed geometry that promotes and maintains a uniform movement of the separation front within the bed. The design of the internal bed flow path is critical in this regard. If these fronts were not uniform, a premature breakthrough at various sectors of the bed would occur at the end of the adsorption and desorption steps. This premature local front breakthrough, for example, would result in a blending of lower purity gases into the bulk product stream, thereby reducing the overall efficiency.

Discontinuities in bed design are particularly acute at the top and bottom corners of the bed where adjoining surfaces meet. This requires designing the vessel with a completely uninterrupted and symmetrical geometry having no discontinuities at either end. The side wall screen assemblies of vessel 10 address this requirement.

Constrained Bed Hold-down System:

Radial bed VPSA vessels must be designed with a constrained bed hold down system to prevent adsorbent fluidization. The gas velocity in certain VPSA cycles is high, resulting in velocities that exceed fluidization levels during parts of the cycle. There is also the possibility of an upset, caused by equipment malfunction, that could cause large scale bed fluidization in a non-restrained bed. Since Vessel 10 includes a uniform dense packed adsorbent, any fluidization of the adsorbent which would disturb this density is detrimental. The above-described bladder hold down system provides the hold down requirement, while creating a uniform flow path within the variable height adsorbent bed. The adsorbent length can vary due to adsorbent settling during operation.

Inlet Flow Distribution:

Flow distribution is an important element of vessel 10. The design pressure drop in the inlet and outlet ports must be kept small to minimize power consumption. This results in the requirement to maintain even flow distribution of the entering gas without creating unnecessary pressure drop or void spaces. If the piping system cannot be designed to provide uniform flow at this inlet, the inlet port of vessel 10 is designed to distribute the incoming gas in a uniform circumferential manner through use of a radial baffle arrangement.

The flow channel connecting inlet port 40 to the outlet tapered channel 20 is also an engineered flow channel. Channel 52 is formed by lower head 33 and lower void tank 35. This passage 52 is tapered to provide smooth transition between the area of inlet 40 and channel 20 and to minimize void volume and pressure drop.

Uniform Bed Packing Density:

As stated above, the bed length in advanced VPSA adsorbers is short and superficial gas velocities are large. This results in a rapidly advancing front during the cycling of the vessel, with the need to keep the front as uniform as possible. If these fronts are not uniform, a premature breakthrough at various sectors of the bed can occur, lowering the efficiency of the separation. The pressure drop through a packed bed structure is a function of the packing density, and the flow is a function of the pressure drop. Therefore, a uniform packing density of the adsorbent becomes critical if uniform front movement is desired.

Vessel 10 accommodates a dense pack loader system which enables a loading of the entire adsorbent bed to a uniform density. The upper head section of vessel 10 is intentionally left unobstructed, and the head space and bed location details are chosen to allow for the loader installation.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A vessel for use in a pressure swing adsorption gas separation process, comprising:
    enclosing wall means defining an enclosed space having a top region and a bottom region;
    an annular adsorbent bed positioned between said top region and bottom region within said enclosed space, having a porous outer wall, a porous inner wall and adsorbent material positioned therebetween, said porous outer wall separated from said enclosing wall means to create a gas feed channel therebetween, said porous inner wall surrounding a chamber;
    inner wall means positioned in said chamber and separated from said porous inner wall to create a product flow channel therebetween;
    gas feed inlet means positioned at said bottom region and in fluid communication with said gas feed channel for providing a gas feed thereto, said gas feed thereby entering said gas feed channel and said adsorbent bed via said porous outer wall and in a direction generally radial towards said inner porous wall and product flow channel; and
    product outlet means positioned at said bottom region and in fluid communication with said product flow channel, for collecting product gas passing thereinto via said porous inner wall and providing an output flow thereof,
    wherein said enclosing wall means is separated from said porous outer wall in such a manner as to create a tapered gas feed channel and wherein said inner wall means is separated from said porous inner wall by a substantially fixed distance to create a substantially constant cross section product feed channel.

2. The vessel as recited in claim 1, wherein said product outlet means includes an outlet conduit in fluid communication with said bottom region and extending upwardly through said top region.

3. The vessel as recited in claim 1, wherein said product outlet means includes an outlet conduit in fluid communication with said bottom region and extending downwardly through said bottom region.

4. The vessel as recited in claim 1, wherein said gas feed inlet means comprises:
    an inlet conduit; and
    distribution means coupled between said inlet conduit and said gas feed channel for imparting a generally radial flow pattern to said gas feed so as to achieve a substantially uniform distribution of feed gas in said gas feed channel.

5. The vessel as recited in claim 4, wherein said distribution means comprises a closed tank having an upper portion which serves as a mechanical support for said annular adsorbent bed and a lower portion which defines an inlet channel, extending from an inlet of said gas feed inlet means to said gas feed channel.

6. The vessel as recited in claim 1, further comprising:
    movable restraint means extending between said porous outer wall and said porous inner wall at upper extremities thereof; and
    means for pressurizing at least a portion of said top region so as to cause said movable restraint means to bear upon an upper surface of said adsorbent material, said top region maintained at a pressure that is in excess of any pressure experienced within said adsorbent bed.

7. The vessel as recited in claim 6, wherein said inner wall means is configured as a tank having an opening in communication with said portion of said top region that is pressurized, thereby enabling said tank to achieve a similar level of pressurization.

8. The vessel as recited in claim 6, wherein said movable restraint means comprises a flexible membrane that is adhered to both said porous outer wall and porous inner wall in a manner to prevent any unswept region in an upper portion of said annular adsorbent bed.

9. The vessel as recited in claim 8, wherein upper ends of said porous outer wall and porous inner wall are positioned within said enclosing wall means so as to accommodate relative movement therebetween under varying temperature conditions.

10. The vessel as recited in claim 1, wherein said gas feed channel exhibits a cross sectional width between said enclosing wall means and said porous outer wall that bears a ratio in a range of 2%–8% of a height of said annular adsorbent bed.

11. The vessel as recited in claim 1, wherein said gas feed channel exhibits a cross sectional width between said enclosing wall means and said porous outer wall that bears a ratio in a range of 4%–5% of a height of said annular adsorbent bed.

12. The vessel as recited in claim 1, wherein said product flow channel exhibits a cross sectional width between said inner wall means and said porous inner wall that bears a ratio in a range of 5%–13% of a height of said annular adsorbent bed.

13. The vessel as recited in claim 1, wherein said product flow channel exhibits a cross sectional width between said inner wall means and said porous inner wall that bears a ratio in a range of 7%–11% of a height of said annular adsorbent bed.

14. The vessel as recited in claim 1, wherein void volume within said gas feed channel and said gas feed inlet means is in a range of 10%–25% of volume of said annular adsorbent bed.

15. The vessel as recited in claim 14, wherein void volume within said product flow channel and said product outlet means is in a range of 3%–10% of volume of said annular adsorbent bed.

16. The vessel as recited in claim 1, wherein said top region is constructed to enable introduction thereinto of a generally radially extending, rotatable conduit to enable dense filling of said annular adsorbent bed.

17. A vessel for use in a pressure swing adsorption gas separation process, comprising:

enclosing wall means defining an enclosed space having a top region and a bottom region;

an annular adsorbent bed positioned between said top region and bottom region within said enclosed space, having a porous outer wall, a porous inner wall and adsorbent material positioned therebetween, said porous outer wall separated from said enclosing wall means to create a gas feed channel therebetween, said porous inner wall surrounding a chamber;

inner wall means positioned in said chamber and separated from said porous inner wall to create a product flow channel therebetween;

gas feed inlet means positioned at said bottom region and in fluid communication with said gas feed channel for providing a gas feed thereto, said gas feed thereby entering said gas feed channel and said adsorbent bed via said porous outer wall and in a direction generally radial towards said inner porous wall and product flow channel; and product outlet means positioned at said bottom region and in fluid communication with said product flow channel, for collecting product gas passing thereinto via said porous inner wall and providing an output flow thereof, wherein said product outlet means comprises first conduit means to direct said output flow of said product gas downwardly into said bottom region, and wherein said product outlet means includes an outlet conduit in fluid communication with said first conduit means in said bottom region and extending upwardly through said top region.

18. The vessel as recited in claim 17 wherein said enclosing wall means is separated from said porous outer wall in such a manner as to create a tapered gas feed channel.

19. The vessel as recited in claim 18, wherein said inner wall means is separated from said porous inner wall by a substantially fixed distance to create a substantially constant cross section product feed channel.

* * * * *